United States Patent [19]

Akahoshi et al.

[11] Patent Number: 4,981,701
[45] Date of Patent: Jan. 1, 1991

[54] FERMENTED MILK CONTAINING BUTTER FAT AND PROCESS OF PRODUCING THE SAME

[75] Inventors: Ryoichi Akahoshi; Yoshiharu Kuma; Susumu Mizusawa; Akifumi Doi; Masatugu Yamasita, all of Tokyo, Japan

[73] Assignee: Kabushiki Kaisha Yakult Honsha, Tokyo, Japan

[21] Appl. No.: 374,778

[22] Filed: Jul. 3, 1989

[30] Foreign Application Priority Data

Jul. 5, 1988 [JP] Japan ................... 63-165926

[51] Int. Cl.$^5$ .................... A23L 1/035; A23C 9/13
[52] U.S. Cl. .................................. 426/34; 426/61; 426/580; 426/586; 426/43; 426/654
[58] Field of Search ............... 426/36, 33, 40, 43, 426/586, 580, 654, 191

[56] References Cited

U.S. PATENT DOCUMENTS

| 4,534,982 | 8/1985 | Yoshida et al. | 426/40 |
| 4,656,041 | 4/1987 | Yagi et al. | 426/657 |
| 4,656,046 | 4/1987 | Yagi et al. | 426/657 |
| 4,670,267 | 6/1987 | Chang et al. | 426/41 |
| 4,808,334 | 2/1989 | Ezaki et al. | 426/570 |
| 4,851,235 | 7/1989 | Schwartz et al. | 426/41 |

Primary Examiner—Marianne Cintins
Attorney, Agent, or Firm—Oblon, Spivak, McClelland, Maier & Neustadt

[57] ABSTRACT

A fermented milk containing butter fat and a method of producing the same. The butter fat is emulsified with a saturated higher fatty acid ester of polyglycerin having an average polymerization degree of 6 or higher and having an HLB of 4 or higher.

4 Claims, No Drawings

FERMENTED MILK CONTAINING BUTTER FAT AND PROCESS OF PRODUCING THE SAME

BACKGROUND OF THE INVENTION

This invention relates to fermented milk containing butter fat and a process of manufacturing such fermented milk.

As consumers have recently become more concerned about testiness with the steady increase in varieties of food, various means of improving the taste of even fermented milk which has a long history as a food, are being studied. Trials have been performed with a view to producing a more tasty fermented milk on the basis of increasing the proportion of butter fat which is, among the various constituents of milk, the ingredient which most profoundly and positively affects the taste.

That is, where a fermented milk is produced by lactic acid fermentation of skimmed milk, whole milk or a mixture of these types of milk, the butter fat content of the product is determined by the proportion of butter fat in the raw product used as the basis material. Accordingly, methods of increasing the proportion of butter fat in the raw material milk by using only whose milk or increasing the proportion of whole milk contained in the raw material, or by adding fresh cream or unsalted butter were first tried. In such methods, however, butter fat is subjected to the fairly high acidity of lactic acid and is maintained at a fermentation temperature of about 40° C. for a long time during lactic acid fermentation. In this process, therefore, the milk fat tends to loose its good flavor. A satisfactory improvement in the taste cannot be expected if the increase in the proportion of butter fat is small. However, it is undesirable to inordinately increase the proportion of butter fat, because to do so results not only in adversely affecting the taste but also in increasing calories which is usually unwelcome.

Thus, a method was tried in which a low-fat raw milk product such as skimmed milk is fermented in a lactic acid fermentation manner and fresh cream or unsalted butter is added to the obtained fermented milk, followed by homogenization. This method makes it possible to avoid the possibility of losing the flavor of butter fat, but it is difficult to achieve a stable emulsified condition by adding butter fat to fermented milk. In the case of a soft type or drink type of fermented milk having a certain degree of fluidity, even if the emulsification is apparently uniform, separation and floating of butter fat takes place to a considerable extent during a period of time ordinarily expected to be taken in consuming the product with relish, resulting in a reduction in the value of the final product. Thus, this method is applicable to the production of hard-type fermented milk alone.

SUMMARY OF THE INVENTION

In view of these circumstances, an object of the present invention is to provide a fermented milk with an improved flavor based on the taste of butter fat.

Another object of the present invention is to provide a stable fermented milk which contains butter fat and in which the butter fat is not liable to separate even if added to fluid fermented milk after lactic acid fermentation.

The present invention provides in one of its aspects a fermented milk containing butter fat wherein the butter fat is emulsified with an emulsifier essentially consisting of saturated higher fatty acid ester of polyglycerin having an average polymerization degree of 6 or higher and having an HLB (hydrophile-lipophile balance) of 4 or higher.

The present invention provides in another of its aspects a method of producing a fermented milk containing butter fat, including the steps of: preparing fermented milk from animal milk; emulsifying butter fat with a saturated higher fatty acid ester of polyglycerin having an average polymerization degree of 6 or higher and having an HLB of 4 or higher; and adding the emulsified butter fat to the fermented milk, followed by homogenization.

DESCRIPTION OF THE PREFERRED EMBODIMENT

In accordance with the present invention, a fermented milk utilizing an optimum amount of butter fat as it relates to taste can be attained by a process in which fermented milk is first produced from raw material milk containing a small proportion of fat, adding butter fat emulsified with a saturated higher fatty acid ester of polyglycerin having an average polymerization degree of 6 or higher (and having an HLB of 4 or higher) to the fermented milk, and then homogenizing the mixture thereby obtained. This production process will be described below in detail.

There is no need for any special type of raw milk to be used as the basis material and no need for special means of performing the lactic acid fermentation. The same process of producing ordinary (low-fat) fermented milk as in the conventional process may be used. Since, as described above, butter fat contained in the raw milk loses its flavor during fermentation and does not contribute to providing the product with a delicious flavor, it is advantageous to use skimmed milk as the raw milk material.

Suitable amounts of butter fat and an emulsifier are added to a fermented milk produced by an ordinary method.

The butter fat to be added is, for example, unsalted butter or a material such as fresh cream having a high butter fat content. It is preferable to control the amount of butter fat mixed in the prepared fermented milk so that the proportion of butter fat in the product is at most 20% by weight. If the proportion of butter fat is excessive, the flavor of the product is otherwise inferior.

The emulsifier must be limited to saturated higher fatty acid esters of polyglycerin, having the above values of polyglycerin polymerization degree and HLB. This limited type of emulsifier has specific effects for stabilizing the emulsification of butter fat in the fermented milk. Preferably, the saturated higher fatty acid ester of polyglycerin used for the present invention is a saturated higher fatty acid ester of polyglycerin having an average polymerization degree of 8 or higher and HLB of 8 or higher, and the ester-linked saturate fatty acid has a carbon number of 16 or more.

The saturated higher fatty acid ester of polyglycerin used in accordance with the present invention is obtained by heating glycerin to a high temperature of 200° C. or higher in the presence of a dehydration catalyst while nitrogen gas is blown to the glycerin to form a polymerisate of glycerin by inter-molecular dehydration reaction. The obtained polymerisate is esterified with a saturated higher fatty acid to obtain the desired saturated higher fatty acid ester of polyglycerin. The HLB thereof is determined by the degree of esterification and by the carbon number of the saturated higher fatty acid. The carbon number of the saturated higher fatty acid part of the emulsifier relates to the taste of the product fermented milk. An emulsifier having a carbon number of less than 16 is not preferable because it tends to give a machine-oil-like smell to the product. If the ease of acquisition is considered, stearate and plamitate are most preferable. The proportion of the emulsifier is preferably about 20% or more of the amount of butter fat and about 2% or less of the total of fermented milk.

The butter fat is mixed with an aqueous solution of the above emulsifier, and the mixture is agitated while being heated to be sterilized as well as homogenized. The mixture is thereafter added to the fermented milk and, if necessary, syrup, gelatinizer, flavour, etc. are further added, followed by homogenization with a homogenizer.

The saturated higher fatty acid ester of polyglycerin used as the emulsifier in accordance with the present invention is specifically superior in its function to stabilize the emulsification of milk fat in the fermented milk. The stability of the properties and the flavour of the fermented milk in accordance with the present invention is therefore remarkably higher than conventional butter fat containing fermented milk using sucrose fatty acid esters as the emulsifier. In consequence, the present invention makes it possible to provide delicious fermented milk by selecting, mainly to improve the taste, an optimum butte fat content and an optimum time to add butter fat without any concern about separation of butter fat during storage.

EXAMPLES

The present invention will be exemplified below by the following examples.

EXAMPLE 1

A bacterium solution containing a mixture of *Streptococcus thermophilus* and *Lactobacillus bulgaricus* was inoculated into a culture medium formed of recombined skimmed milk having a fat-free solid milk content of 25%, and fermented at 40° C. for 15 hr, thereby obtaining a culture solution having a pH value of about 4.5.

Apart from this, 700 g of sucrose was dissolved in water, and 3000 ml of this solution was heated at 100° C. for 30 min. to be sterilized, thereby obtaining a syrup. 30 g of high methoxylpectin was dissolved in water, and 2750 ml of this solution was heated at 100° C. for 30 min. to be sterilized, thereby obtaining a pectin solution.

Further, water was added to 250 g of fresh cream and 50 g of decaglycerin distearate (HLB: 11.0), and this mixture was heated up to 80° C., was preliminarily emulsified by a homo-mixer at 10000 rpm for 3 min. and was thereafter cooled to 10° C.

3750 ml of the culture solution, 3000 ml of the syrup and 2750 ml of the pectin solution and a suitable amount of the emulsified cream were mixed with each other, and a small mount of flavour was added to this mixture. The mixture was then homogenized with a homogenizer, thereby obtaining a drink type of fermented milk (having a butter fat content of 1.0%).

Another drink type of fermented milk (Reference Example 1) was produced in the same manner as Example 1 except that 250 g of fresh cream was added to a raw milk material followed by homogenization before fermentation.

A still further drink type of fermented milk (Reference Example 2) was produced in the same manner as Example 1 except that sucrose monostearate (HLB: 1.5) was used as the homogenizer.

These fermented milk samples were examined by a sensory test for flavor and by a test for separation of butter fat during preservation. The sensory test was conducted with 20 adults of different sexes and health with respect to fermented milk served immediately after preparation. An inspection of significant differences between the samples of fermented milk was carried out using the Reference Example 1 as a standard and using scores shown in Table 1.

Data analysis was conducted on the basis of the scatter analysis two-way layout method (on p. 29 of "Kogyo Niokeru by Kannoh Kensa Handbook" (Industrial Sensory Test Handbook), Nikka Giren Shuppan).

TABLE 1

Score Table

| Marks | Taste | Degree of butter fat taste |
|---|---|---|
| 3 | Extremely delicious | Extremely high |
| 2 | Very delicious | Very high |
| 1 | Delicious | Slightly high |
| 0 | Same | Same |
| −1 | Somewhat unsavory | Somewhat low |
| −2 | Very unsavory | Very low |
| −3 | Extremely unsavory | Extremely low |

For the evaluation of butter fat separation, prepared samples of fermented milk were placed in vessels having a capacity of 125 ml and were left in a refrigerator to stand at 10° C. for 14 days followed by visual observation of separation.

The results of this test are as shown in Tables 2 to 4 in which an asterisk indicates the existence of a significant difference with a risk factor of 5%.

TABLE 2

| | Taste Score | Characteristics |
|---|---|---|
| Present invention | +0.62* | Soft sourness, mild taste |
| Reference Example 1 | 0.00 | Monotonous, flat, strong sourness |
| Reference Example 2 | +0.59* | Soft sourness, mild taste |

TABLE 3

Butter Fat Taste

| | Score |
|---|---|
| Present invention | +0.68* |
| Reference Example 1 | 0.00 |
| Reference Example 2 | 0.70* |

TABLE 4

Separation of Butter fat

| | No standing | After 7 days | After 14 days |
|---|---|---|---|
| Present invention | − | − | − |
| Reference Example 1 | − | − | − |
| Reference Example 2 | − | ++ | ++ |

Note
−: No separation of butter fat
+: Aggregation of butter fat was observed; an upper portion was whitish (the emulsified state was restored by shaking and thereafter no aggregation was observed for 24 hours).
++: butter fat was completely separated and floated on the surface.

EXAMPLE 2

A bacterium solution containing a mixture of *Streptococcus thermophilus* and *Lactobacillus bulgaricus* was inoculated into a culture medium formed of recombined skimmed milk having a fat-free solid milk content of 25%, and fermented at 40° C. for 15 hr, thereby obtaining a culture solution having a pH value of about 4.5.

Apart from this, 700 g of sucrose was dissolved in water, and 3000 ml of this solution was heated at 100° C. for 30 min. to be sterilized, thereby obtaining a syrup. 7 of low-methoxylpectin was dissolved in water, and 2750 ml of this solution was heated at 100° C. for 30 min. to be sterilized, thereby obtaining a pectin solution.

Further, water was added to 250 g of fresh cream and 50 g of decaglycerin distearate (HLB: 11.0), and this mixture was heated up to 80° C., was preliminarily emulsified by a homo-mixer at 10000 rpm for 3 min. and was thereafter cooled to 10° C.

3750 ml of the culture solution, 3000 ml of the syrup and 2750 ml of the pectin solution and a suitable amount of the emulsified cream were mixed with each other, and a small mount of a flavour was added to this mixture. This mixture was then homogenized with a homogenizer, thereby obtaining a soft type of fermented milk (having a butter fat content of 1.0%).

This fermented milk was made to stand at 10° C. for 14 days and the state of separation of butter fat was observed. However, no separation was observed. The taste of this fermented milk was compared with that of a reference example which was made in the same manner except that fresh cream was added before fermentation without using any emulsifier. The taste of the fermented milk of the present invention was superior.

EXAMPLE 3

Various samples of drink type yogurt were produced in the same production process as Example 1 while varying the emulsifier (including that for reference samples). Fermented milk samples thereby obtained were tested in order to examine the influence of the emulsifier upon the flavor. The test was conducted with 5 panelists, with a reference product in which no emulsifier was used. Further, separation of butter fat was observed during storage in the same manner as Example 1. The results of this test are shown in Table 5.

TABLE 5

| Emulsifier | | | | Flabor of product, in reference to product with no emulsifier | Separation of butter fat | | |
|---|---|---|---|---|---|---|---|
| Hydrophilic group | Polmerization degree | Fatty acid part | HLB | | No standing | After 7 days | After 14 days |
| sucrose | — | $C_{15}$, sat. | 15 | No difference | — | ++ | ++ |
| | — | $C_{18}$, sat. | 15 | " | — | ++ | ++ |
| | 2 | $C_{16}$, sat. | 7.3 | " | — | ++ | ++ |
| | 2 | $C_{18}$, sat. | 6.9 | " | — | ++ | ++ |
| | 3 | $C_{18}$, unsat. | 8.8 | Machine-oil-like smell | — | ++ | ++ |
| | 3 | $C_{18}$, sat. | 8.8 | No difference | — | ++ | ++ |
| | 6 | $C_{18}$, unsat. | 10.5 | Machine-oil-like smell | — | + | ++ |
| Poly-Glycerin | 6 | $C_{18}$, sat. | 10.5 | No difference | — | + | ++ |
| | 8 | $C_{14}$, sat. | 13.5 | strong bitter taste | — | — | + |
| | 8 | $C_{16}$, sat. | 12.0 | No difference | — | — | + |
| | 8 | $C_{18}$, unsat. | 12.0 | Machine-oil-like smell | — | — | + |
| | 8 | $C_{18}$, sat. | 11.0 | No difference | — | — | — |
| | 8 | $C_{18}$, sat. | 9.0 | " | — | — | — |
| | 10 | $C_{18}$, unsat. | 14.5 | Machine-oil-like smell | — | — | + |
| | 10 | $C_{18}$, sat. | 12.0 | No difference | — | — | — |
| | 10 | $C_{18}$, sat. | 11.0 | " | — | — | — |
| | 10 | $C_{18}$, sat. | 8.0 | " | — | — | — |
| | 10 | $C_{18}$, sat. | 6.0 | " | — | — | + |
| | 10 | $C_{18}$, sat. | 4.5 | " | — | — | + |
| | 20 | $C_{18}$, sat. | 15.0 | " | — | — | — |
| | 20 | $C_{18}$, sat. | 11.0 | " | — | — | — |
| No emulslsifier | | | | | — | ++ | ++ |

Note
—: No separation of butter fat
+: Aggregation of butter fat was observed; an upper portion was whitish (the emulsified state was restored by shaking and thereafter no aggregation was observed for 24 hours).
++: butter fat was completely separated and floated on the surface.

What is claimed is:

1. A fermented milk containing butter fat wherein the butter fat is emulsified with an emulsifier consisting essentially of a saturated higher fatty acid ester of polyglycerin having an average polymerization degree of 6 or higher and having an HLB of 4 or higher.

2. A fermented milk according to claim 1, wherein the carbon number of said saturated higher fatty acid ester of polyglycerin is 16 or more.

3. A method of producing a fermented milk containing butter fat, comprising the steps of: preparing fermented milk from animal milk; emulsifying butter fat with an emulsifier consisting essentially of a saturated higher fatty acid ester of polyglycerin having an average polymerization degree of 6 or higher and having an HLB of 4 or higher; adding the emulsified butter fat to the fermented milk; and homogenizing the fermented milk with the emulsified butter fat added thereto.

4. A fermented milk containing butter fat produced by the method of claim 3.

* * * * *